(12) United States Patent
Ikeda et al.

(10) Patent No.: US 11,379,340 B2
(45) Date of Patent: Jul. 5, 2022

(54) APPARATUS AND METHOD FOR ESTIMATING ANOMALY INFORMATION, AND PROGRAM

(71) Applicant: NIPPON TELEGRAPH AND TELEPHONE CORPORATION, Chiyoda-ku (JP)

(72) Inventors: Yasuhiro Ikeda, Musashino (JP); Keisuke Ishibashi, Musashino (JP); Yusuke Nakano, Musashino (JP); Keishiro Watanabe, Musashino (JP); Ryoichi Kawahara, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 283 days.

(21) Appl. No.: 16/603,080

(22) PCT Filed: Nov. 9, 2017

(86) PCT No.: PCT/JP2017/040413
§ 371 (c)(1),
(2) Date: Oct. 4, 2019

(87) PCT Pub. No.: WO2018/211721
PCT Pub. Date: Nov. 22, 2018

(65) Prior Publication Data
US 2020/0073778 A1    Mar. 5, 2020

(30) Foreign Application Priority Data
May 17, 2017    (JP) .............................. JP2017-098080

(51) Int. Cl.
*G06F 11/00*    (2006.01)
*G06F 11/34*    (2006.01)
(Continued)

(52) U.S. Cl.
CPC ...... *G06F 11/3452* (2013.01); *G06F 11/3466* (2013.01); *G06K 9/6221* (2013.01); *G06N 20/10* (2019.01)

(58) Field of Classification Search
CPC .................................................. G06F 11/3452
(Continued)

(56) References Cited

U.S. PATENT DOCUMENTS
2012/0204063 A1    8/2012   Kanazawa

FOREIGN PATENT DOCUMENTS
JP    2012-163357 A    8/2012

OTHER PUBLICATIONS
International Search Report dated Dec. 19, 2017 in PCT/JP2017/040413 filed on Nov. 9, 2017.
(Continued)

*Primary Examiner* — Timothy A Mudrick
(74) *Attorney, Agent, or Firm* — Oblon, McClelland, Maier & Neustadt, L.L.P.

(57) ABSTRACT

An apparatus for estimating anomaly information includes an input unit configured to input anomaly data detected as anomaly by an anomaly detecting algorithm that outputs an anomaly degree of input data for vectors, using learning of the vectors in a normal state, and an estimate unit configured to search for one or more vectors that decrease the degree of anomaly when added to the anomaly data, taking into account a likelihood, for each dimension, of a given dimension being a cause of the anomaly, and estimate the cause of the anomaly based on the searched vectors whereby it is possible to estimate detailed information on a detected anomaly.

20 Claims, 11 Drawing Sheets

(51) Int. Cl.
*G06N 20/10* (2019.01)
*G06K 9/62* (2022.01)

(58) Field of Classification Search
USPC .......................................................... 714/100
See application file for complete search history.

(56) References Cited

OTHER PUBLICATIONS

Hodge, Victoria J., et al., "A Survey of Outlier Detection Methodologies," Artificial Intelligence Review, vol. 22, No. 2 (2004), pp. 85-126.
Sakurada, M. et al., "Dimensionality Reduction with the Autoencoder for Anomaly Detection of Spacecrafts," The 28$^{th}$ Annual Conference of the Japanese Society for Artificial Intelligence, May 12, 2014, pp. 1-3.
Beck, A. et al., "A Fast Iterative Shrinkage—Thresholding Algorithm for Linear Inverse Problems," SIAM J. Imaging Sciences, vol. 2, No. 1, 2009, pp. 183-202.
Bryan, K. et al., "Penalty Functions and Constrained Optimization," Dept. of Mathematics, Rose—Hulman Institute of Technology, 2005, pp. 1-6.
Jain, A. K., "Data clustering: 50 years beyond K-means," Pattern Recognition Letters, vol. 31, No. 8, 2010, pp. 651-666.
Tran, Thanh N., et al., "Revised DBSCAN algorithm to cluster data with dense adjacent clusters," Chemometrics and Intelligent Laboratory Systems, vol. 120, 2013, pp. 92-96.
Maaten, Laurens van der, et al., "Visualizing data using t-SNE," Journal of Machine Learning Research, vol. 9, 2008, pp. 2579-2605.
Tavallaee, M. et al., "A Detailed Analysis of the KDD Cup 99 Data Set," Computational Intelligence for Security and Defense Applications, CISDA, 2009, IEEE Symposium on IEEE, 6 pages.

FIG.9

| TRIAL No. | 1 | 2 | 3 | 4 | 5 | 6 | 7 | 8 | 9 | 10 | ave. |
|---|---|---|---|---|---|---|---|---|---|---|---|
| OUTLIER | 0.5 | 1 | 1 | 0.1 | 1 | 1 | 0.2 | 0.2 | 0.8 | 0.9 | 0.67 |
| RECONFIGURATION ERROR | 0.9 | 0.9 | 1 | 0.9 | 1 | 0.9 | 0.9 | 1 | 0.8 | 1 | 0.93 |
| CAUSE DEGREE (WITHOUT SPARSE TERM) | 0.5 | 0.5 | 0.5 | 0.5 | 0.5 | 0.5 | 0.5 | 0.5 | 0.5 | 0.5 | 0.5 |
| CAUSE DEGREE (WITH SPARSE TERM) | 1 | 1 | 1 | 1 | 1 | 1 | 1 | 1 | 1 | 1 | 1 |

FIG.10

| TRIAL No. | 1 | 2 | 3 | 4 | 5 | 6 | 7 | 8 | 9 | 10 | ave. |
|---|---|---|---|---|---|---|---|---|---|---|---|
| normal | 16 | 17 | 13 | 21 | 16 | 19 | 14 | 29 | 16 | 15 | 17.6 |
| outlier | 16 | 16 | 18 | 16 | 16 | 17 | 18 | 18 | 19 | 16 | 17 |
| recon. | 15 | 15 | 15 | 14 | 15 | 17 | 14 | 16 | 15 | 14 | 15 |

APPARATUS AND METHOD FOR ESTIMATING ANOMALY INFORMATION, AND PROGRAM

TECHNICAL FIELD

The present invention relates to an apparatus and a method for estimating anomaly information, and a program.

BACKGROUND ART

For a system that has a function of observing various data in real time from a system to be observed, in a case of using data in a normal state to learn a correlation between metrics in the normal state (between observed data), when test data has a broken correlation between the metrics in the normal state, an algorithm that outputs an "anomaly degree" of the test data is proposed (e.g., Non-Patent Documents 1 and 2). With such an algorithm, the presence or absence of anomaly can be determined by metrics each of which is applied to a one-dimensional "anomaly degree", even when there is a large amount of data to be observed.

CITATION LIST

Patent Literature

[NPTL 1] Hodge, Victoria J., and Jim Austin. "A survey of outlier detection methodologies." Artificial intelligence review 22.2 (2004): 85-126.

[NPTL 2] Mayu Sakurada and Takehisa Yairi, "Dimensionality Reduction with the Autoencoder for Anomaly Detection of Spacecrafts," the 28th Annual Conference of the Japanese Society for Artificial Intelligence, 1-3, 2014

SUMMARY OF INVENTION

Technical Problem

In the related art, it is possible to determine the presence or absence of anomaly based on the "anomaly degree." However, detailed information on an anomaly cannot be easily obtained when the anomaly is detected.

In light of the points described above, the present invention is made, and an objective of the present invention is to enable an estimation of detailed information on a detected anomaly.

Solution to Problem

In order to solve the problem, an apparatus for estimating anomaly information includes an input unit configured to input anomaly data detected as anomaly by an anomaly detecting algorithm that outputs an anomaly degree of input data for vectors, using learning of the vectors in a normal state, and an estimate unit configured to search for one or more vectors that decrease the degree of anomaly when added to the anomaly data, taking into account a likelihood, for each dimension, of a given dimension being a cause of the anomaly, and estimate the cause of the anomaly based on the searched vectors.

Advantageous Effects of Invention

Detailed information on a detected anomaly can be estimated.

BRIEF DESCRIPTION OF DRAWINGS

FIG. 9 is a diagram illustrating a ratio as indicated by actual causes in a case of estimating causes according to the first embodiment;

FIG. 10 is a diagram illustrating calculation time obtained when an initial value is set in a case of estimating causes according to the third embodiment;

DESCRIPTION OF EMBODIMENTS

Figure 1:
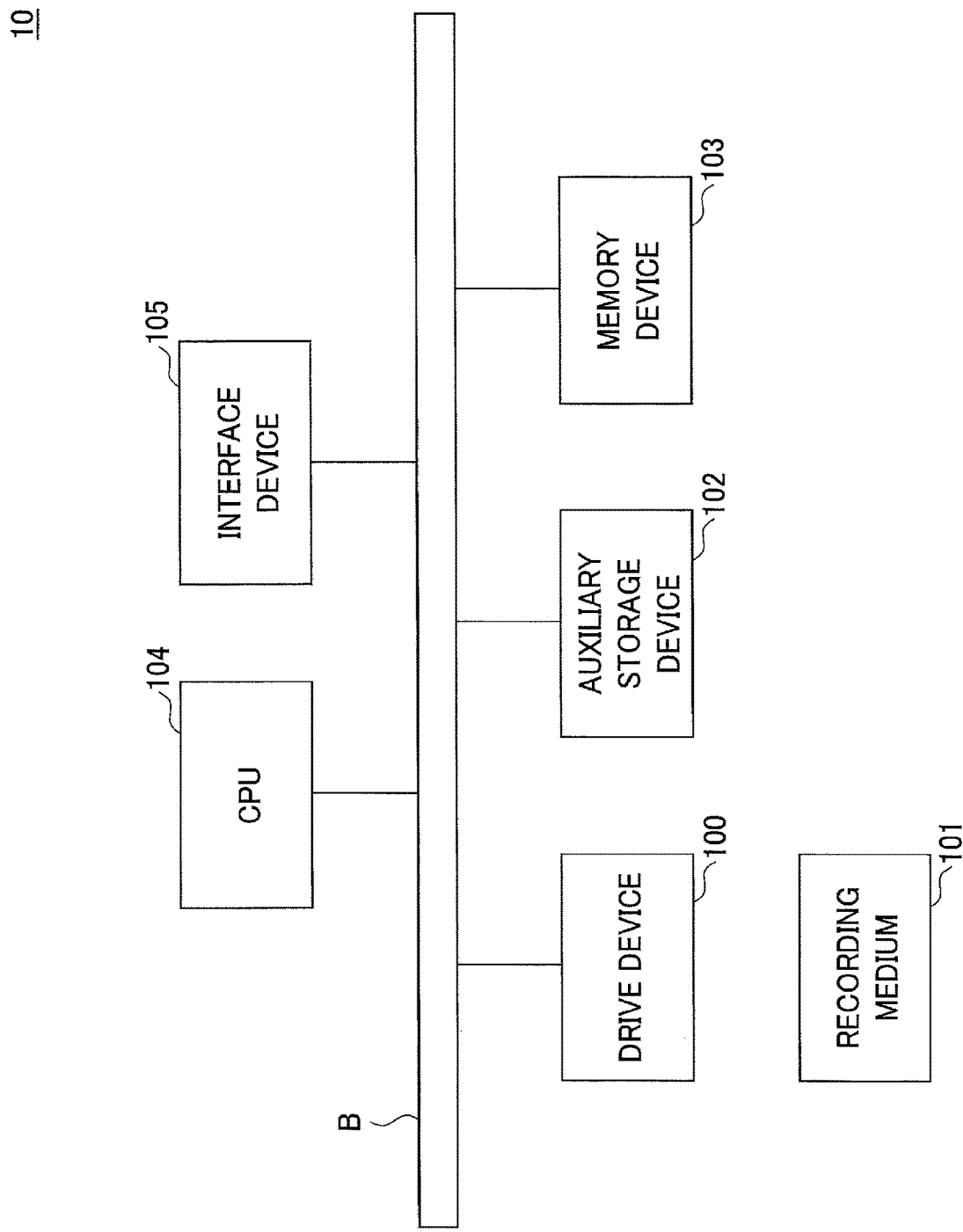
FIG. 1 is a diagram illustrating an example of a hardware configuration of an anomaly cause estimating apparatus 10 according to a first embodiment.

Hereinafter, embodiments of the present invention will be described with reference to the drawings. FIG. 1 is a diagram illustrating an example of a hardware configuration of an anomaly cause estimating apparatus 10 according to a first embodiment. The anomaly cause estimating apparatus 10 in FIG. 1 includes a drive device 100, an auxiliary storage device 102, a memory device 103, a CPU 104, an interface device 105, and the like, which are interconnected via a bus B.

A program that implements processing of the anomaly cause estimating apparatus 10 is provided by a recording medium 101 such as a CD-ROM. When the recording medium 101 that stores the program is set in the drive device 100, the program is installed on the auxiliary storage device 102 from the recording medium 101 through the drive device 100. However, such a program is not always required to be installed through the recording medium 101, and may be downloaded from other computers via a network. The auxiliary storage device 102 stores the installed program as well as storing necessary file(s), data, and the like.

The memory device 103 retrieves a program from the auxiliary storage device 102 to store the program, when an instruction to boot a program is received. The CPU 104 implements a function for use in the anomaly cause estimating apparatus 10 according to the program stored in the memory device 103. The interface device 105 is used as an interface for connecting to a network.

Figure 2:
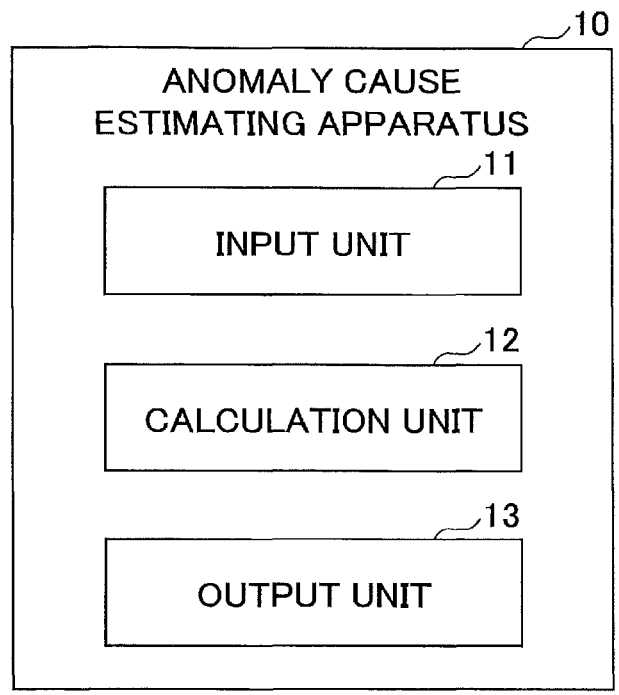
FIG. 2 is a diagram illustrating an example of a functional configuration of the anomaly cause estimating apparatus 10 according to the first embodiment.

FIG. 2 is a diagram illustrating an example of a functional configuration of the anomaly cause estimating apparatus 10 according to the first embodiment. When an anomaly is detected by an anomaly detecting algorithm for detecting an anomaly based on a plurality of types of observed data observed by a system to be observed, in order to estimate its cause, the anomaly cause estimating apparatus 10 accurately estimates cause(s), taking into account a likelihood of each dimension (each observed data) being a cause. In order to perform such an estimation of causes, the anomaly cause estimating apparatus 10 includes an input unit 11, a calculation unit 12, an output unit 13, and the like. Each of these units is implemented by one or more programs that are installed on the anomaly cause estimating apparatus 10 and that are executed by the CPU 104.

Note that the system to be observed may be a network. In this case, observed data may include MIB (Management Information Base) data, flow data by NetFlow, or/and CPU utilization, etc.

Figure 3:
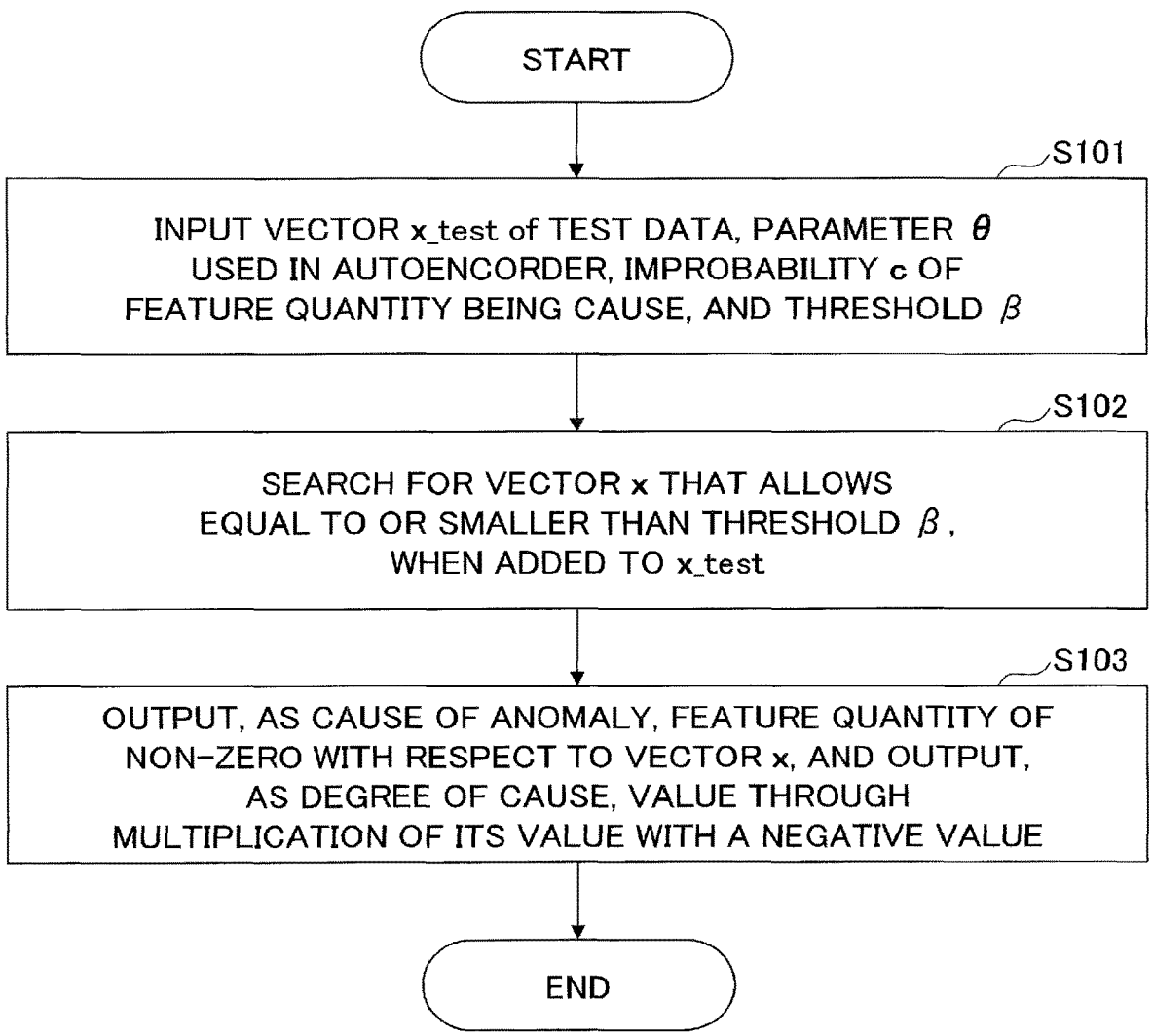
FIG. 3 is a flowchart for explaining an example of a processing procedure performed by the anomaly cause estimating apparatus 10 according to the first embodiment.

FIG. 3 is a flowchart for explaining an example of a processing procedure performed by the anomaly cause estimating apparatus 10 according to the first embodiment. In this description, an autoencoder (Non-Patent Document 2) is used as an anomaly detecting algorithm. However, other algorithms known in the art, such as principal component analysis or a variational automatic encoder (Variational AutoEncoder), may be used as the anomaly detecting algorithm.

In anomaly detection, when certain observed data (test data) is detected as anomaly, a feature vector x_test=(x_test_1, x_test_2, . . . , x_test_N); a parameter set e used in the autoencoder; an improbability c (or a likelihood of cause)=(c_1, . . . , c_N), for each dimension of the feature vector, of a feature value being a cause; and, a threshold β for an anomaly degree are inputted by the input unit 11 (S101).

By way of example, the feature vector of the test data refers to a vector that takes each dimension determining a feature value per unit time, with respect to given observed data. For example, unit time is 1 minute, and a feature value is extracted every 1 minute. Further, such a feature value expresses a total number of transmission bytes on each protocol (TCP, UDP). In this case, as a set of transmission data used on the TCP for 1 minute and a set of transmission data used on the UDP for 1 minute, respectively, a total number of transmission bytes of a total flow in which the protocol is the TCP and a total number of transmission bytes of a total flow in which the protocol is the UDP, etc., are calculated, and a two-dimensional vector in which such feature quantities are respective dimensional elements is generated.

Further, θ is a parameter used in the autoencoder that uses learning of data in a normal state. An anomaly degree outputted by the autoencoder is expressed by f(x_test, θ). In the following description, for simplicity, the notation θ is omitted, and the anomaly degree is simply expressed by f(x_test).

Subsequently, with entry to the autoencoder, the calculation unit 12 searches for vector(s) x that allows an anomaly degree to be equal to or smaller than a threshold β, by adding given dimensions of x to respective dimensions of x_test (S102). That is, x is searched such that f(x_test+x) indicates a value equal to or smaller than the threshold β. For the searched x, dimension(s) of which value(s) are non-zero are estimated as cause(s) of the anomaly.

In the search, $\lambda \|c \cdot x\|\_1\_p$ is considered (added) as a term for making it difficult to select a feature value (dimension) represented by a high improbability c of a cause. For example, $f(x\_test+x)+\lambda \|c \cdot x\|\_1\_p$ is set as an objective function. Vector(s) x are searched such that the objective function indicates a value equal to or smaller than the threshold β. Where, λ denotes a coefficient of the term, c·x denotes a product of c and x for each element, and $\|\cdot\|\_1\_p$ denotes 1_p norm. For example, in a case of p≤1, $\lambda \|c \cdot x\|\_1\_p$ serves as a sparse term that minimizes to the extent possible the number of non-zero elements in terms of x. The case of p=1 is described below.

λ is a parameter for adjusting an extent that decreases non-zero elements. Non-zero elements are decreased as λ increases. As a manner of setting λ, a manner of inputting λ directly from the input unit 11, etc. may be used. Alternatively, the following method may be used: a sparseness as desired, e.g., how many non-zero elements are allowed, is inputted by the input unit 11, and further, various values of λ are stored internally (e.g., the auxiliary storage device 102, etc.). From among solutions through respective adopted values of λ, a solution that matches the desired sparseness most is used as a given solution.

By way of example, as a manner of setting c, in a case where a probability of a corresponding feature value being a cause of an anomaly is known, a value proportional to an inverse of such a probability may be used. Alternatively, in a case where the mean obtained by a distribution of corresponding feature quantities in a normal state is x_train_mean_i, and further, standard deviation is x_train_std_i, when a value obtained through division of an error from the mean by the standard deviation is defined as an outlier, a value proportional to an inverse of an absolute value of the outlier may be used as a manner of setting c. Alternatively, in a case where an anomaly detecting algorithm is an algorithm that outputs a vector taking a same dimension as inputted test data and that considers a distance between the outputted vector and a vector of the test data as an anomaly degree, a value proportional to an inverse of an absolute value of a reconfiguration error x_test_i−y_i, which is error between a value x_test_i of the test data and an output vector y_i in terms of a dimension corresponding to x_test_i, etc., may be used as a manner of setting c.

Also, if all improbabilities c of feature quantities being causes are same, i.e., in a case of c_1=c_2= . . . =c_N=1, $\lambda \|c \cdot x\|\_1\_p$ indicates a general sparse term.

In this description, an example of c_1=c_2= . . . =c_N=1 is described. In such a manner, an optimization problem to be solved by the calculation unit 12 is expressed below.

$$\min\_x f(x\_test+x)+\lambda \|x\|\_1$$

By solving such an optimization problem until f(x_test+x)≤β is set, vector(s) that allow an anomaly degree to be equal to or smaller than the threshold β are searched. Various approaches to solve the optimization problem of |_1 norm as described above, are proposed. For example, it can be efficiently solved using an accelerated proximal gradient method. For the accelerated proximal gradient method, literature such as "Beck, Amir, and Marc Teboulle. "A fast iterative shrinkage-thresholding algorithm for linear inverse problems." SIAM journal on imaging sciences 2.1 (2009): 183-202" may be referenced.

Subsequently, the output unit 13 outputs, as a feature value being a cause of an anomaly, a feature value corresponding to a dimension of non-zero with respect to x, and outputs, as a degree of cause, a value through multiplication of a value of the dimension of non-zero with a negative value (S103). In other words, with respect to x, a feature value corresponding to the dimension of non-zero is estimated as a cause of an anomaly. For example, a negative value is multiplied for the reason that, in a case where x_i is a positive value, x_i indicates that an anomaly degree is decreased when x_test_i is further increased. In other words, this makes x_test_i indicate a smaller value than in a normal status.

Hereafter, a second embodiment is described. In the second embodiment, explanation will be provided for the different points from the first embodiment. In the second embodiment, a point not specifically described may be similar to the first embodiment.

In order to estimate a cause of an anomaly, the second embodiment provides a method of estimating a more likely cause through a solution under a constraint condition of values that can be taken as feature quantities.

In step S101, in addition to the parameters used in the first embodiment, the input unit 11 inputs a constraint condition of values that can be taken as feature quantities. For example, a greatest value or/and a smallest value may be inputted as the constraint condition. In this case, when a feature value does not represent a negative value, as with a traffic amount, a smallest value is inputted as 0.

In step S102, with respect to the optimization problem in the first embodiment, the calculation unit 12 solves such an optimization problem with adding the inputted constraint condition. For example, when all input information involves feature quantities that do not represent negative values, the optimization problem may be expressed below.

$$\min\_x f(x\_test+x)+\lambda\|x\|\_1$$

$$Sbj.\text{to } x\_test\_i+x\_i \geq 0 \text{ for all } i$$

As a manner of solving an optimization problem under a constraint condition, a penalty method, in which a term is inserted into an objective function so as to increase the objective function when the constraint condition is not satisfied, or the like may be used. For the penalty method, literature such as "Kurt Bryan and Yosi Shibberu, "Penalty Functions and Constrained Optimization." Dept. of Mathematics, Rose-Hulman Institute of Technology, 2005" may be referenced.

Hereafter, a third embodiment is described. In the third embodiment, explanation will be provided for the different points from the first embodiment. In the third embodiment, a point not specifically described may be similar to the first embodiment.

In order to solve an optimization problem that estimates a cause of an anomaly, the third embodiment provides a method in which an initial value of a solution is preliminarily set, thereby reducing computation time to solve such a problem as well as estimating a more likely cause.

In step S101, in addition to the parameters used in the first embodiment, a value indicative of a variation from a normal state of each dimension (each feature value) of test data is inputted by the input unit 11. For example, as the value indicative of the variation, an outlier or a reconstruction error in the first embodiment may be used.

In step S102, when solving an optimization problem, the calculation unit 12 uses an initial value of x as x_0, and sets x_0 as a value proportional to a value through multiplication of the variation of each feature value, inputted by the input unit 11, with a negative value. For example, when a reconfiguration error is used as the value indicative of the variation, it is set as $x\_0\_i=-\alpha(x\_test\_i-y\_i)$. Where, α is a proportional constant. The y_i is a value reconstructed for an i-th dimension, in consideration of a correlation between other dimension(s) and the i-th dimension. When x_test_i − y_i is a positive value, a probability of x_test_i being optimally a smaller value is high, in consideration of a correlation with other dimension(s). For this reason, an initial value x_0_i used in the search is set as a positive value proportional to −(x_test_i−y_i). As a result, it is understood that an optimal solution is obtained more speedily and thus computation time can be reduced. As some solutions that solve an optimization problem, a local solution in response to an initial value may be outputted. In this case, with an initial value being set based on outlier(s) or/and reconstruction error(s), it is expected that a more likely cause is output as a solution.

Hereafter, a fourth embodiment is described. In the fourth embodiment, explanation will be provided for the different points from the first embodiment. In the fourth embodiment, a point not specifically described may be similar to the first embodiment.

In order to solve an optimization problem that estimates a cause of an anomaly, the fourth embodiment provides a method in which dimensions to be operated in searching a solution are restricted, thereby reducing computation time to solve such a problem as well as estimating a more likely cause.

As in the third embodiment, in step S101, in addition to the parameters used in the first embodiment, the input unit 11 inputs a value indicative of a variation from a normal state of each feature value, as well as a threshold γ.

In step S102, when the calculation unit 12 solves an optimization problem, with respect to x, each dimension in which the inputted variation from the normal state is less than the threshold value γ is fixed to 0, and further, search is performed by operating only each dimension in which the variation from the normal state is equal to or greater than the threshold γ. This is because a probability, with respect to each dimension with respect to a small variation from the normal state, of a given dimension being a cause of an anomaly is low. With such dimension(s) not being operated, only other dimension(s) are the subject to search. Accordingly, it is understood that a search area used in the optimization problem is restricted, thereby reducing computation time. Further, such a restriction leads to dimensions not being operated, the dimensions being unlikely to be causes of anomalies. Thereby, it is expected that a more likely cause is output as a solution.

Hereafter, a fifth embodiment is described. In the fifth embodiment, explanation will be provided for the different points from the first embodiment. In the fifth embodiment, a point not specifically described may be similar to the first embodiment.

In order to solve an optimization problem that estimates a cause of an anomaly, the fifth embodiment provides a case where an initial value is set as with the third embodiment and a search area is restricted as with the fourth embodiment, thereby reducing computation time of the optimization problem.

Note that a combination of the above embodiments is not limited to the third and fourth embodiments. Each of the above embodiments may be suitably combined.

Hereafter, a sixth embodiment is described. In the sixth embodiment, explanation will be provided for the different points from the first embodiment. In the sixth embodiment, a point not specifically described may be similar to the first embodiment.

In the sixth embodiment, the output unit 13 further sets a threshold θ for an absolute value of each dimension of x, and outputs, as a feature value being a cause of an anomaly, a feature value corresponding to a dimension in which an absolute value exceeds the threshold θ. In this description, the threshold θ is considered to be based on a statistic quantity with respect to the total absolute value for each dimension of x. An example of the statistic quantity includes the mean of absolute values for each dimension of x, or the like.

Hereafter, a seventh embodiment is described. In the seventh embodiment, explanation will be provided for the different points from the first embodiment. In the seventh embodiment, a point not specifically described may be similar to the first embodiment.

In the seventh embodiment, the output unit 13 further sets a threshold $\theta$ for an absolute value in each dimension of x, and outputs, as a feature value being a cause of an anomaly, a feature value corresponding to a dimension in which an absolute value exceeds the threshold $\theta$. The threshold $\theta$ for the absolute value in each dimension of x is determined based on cause degree(s) of a given dimension of test data that was previously determined as anomaly, as well as information indicating whether each dimension was actually an anomaly. In this description, the cause degree means a value of a given dimension of x.

Test data $y\_t=(y\_\{t,1\}, \ldots, y\_\{t,N\})$, which was previously determined as anomaly, as well as a label $z\_t=(z\_\{t,1\}, \ldots, z\_\{t,N\})$ where $t=1, \ldots, T$, which indicates whether or not each dimension was actually a cause of an anomaly, are preliminarily stored in the auxiliary storage device 102. Where, $z\_\{t,i\}$ indicates 1 when $y\_\{t,i\}$ was a cause of an anomaly, otherwise $z\_\{t,i\}$ indicates 0. In this case, the threshold $\theta$ is determined based on a statistic quantity of cause degrees in dimensions that were previously causes of anomalies, as well as a statistic quantity of degrees of anomalies in dimensions that were not causes of anomalies. In this description, the threshold $\theta$ is taken as the mean of the sum of: the mean of absolute values in respective dimensions being previously cause degrees; and the mean of absolute values in respective dimensions not being previously cause degrees. In other words, it is calculated as below.

$$\theta=(\Sigma\_\{i=1\}^N\Sigma\_\{t=1\}^T z\_\{t,i\}y\_\{t,i\}/\Sigma\_\{i=1\}^N\Sigma\_\{t=1\}^T z\_\{t,i\}+\Sigma\_\{i=1\}^N\Sigma\_\{t=1\}^T(1-z\_\{t,i\})y\_\{t,i\}/\Sigma\_\{i=1\}^N\Sigma\_\{t=1\}^T(1-z\_\{t,i\}))/2$$

Hereafter, an eighth embodiment is described. In the eighth embodiment, explanation will be provided for the different points from the first embodiment. In the eighth embodiment, a point not specifically described may be similar to the first embodiment.

In the eighth embodiment, the output unit 13 sorts absolute values in each dimension of x, and outputs, as dimension(s) being cause(s) of anomalies, dimension(s) on a side in which an absolute value is larger, in a case of marking a greatest difference in the absolute values between adjoining dimensions, the greatest difference being regarded as the boundary between a dimension being the cause of the anomaly and a dimension not being the cause of the anomaly. This is based on the assumption that, in a case of sorting all dimensions by absolute value indicative of a case degree, there is a large difference in the absolute values indicative of respective cause degrees between dimensions that are causes of the anomaly and dimensions that are not causes of the anomaly.

Figure 4:
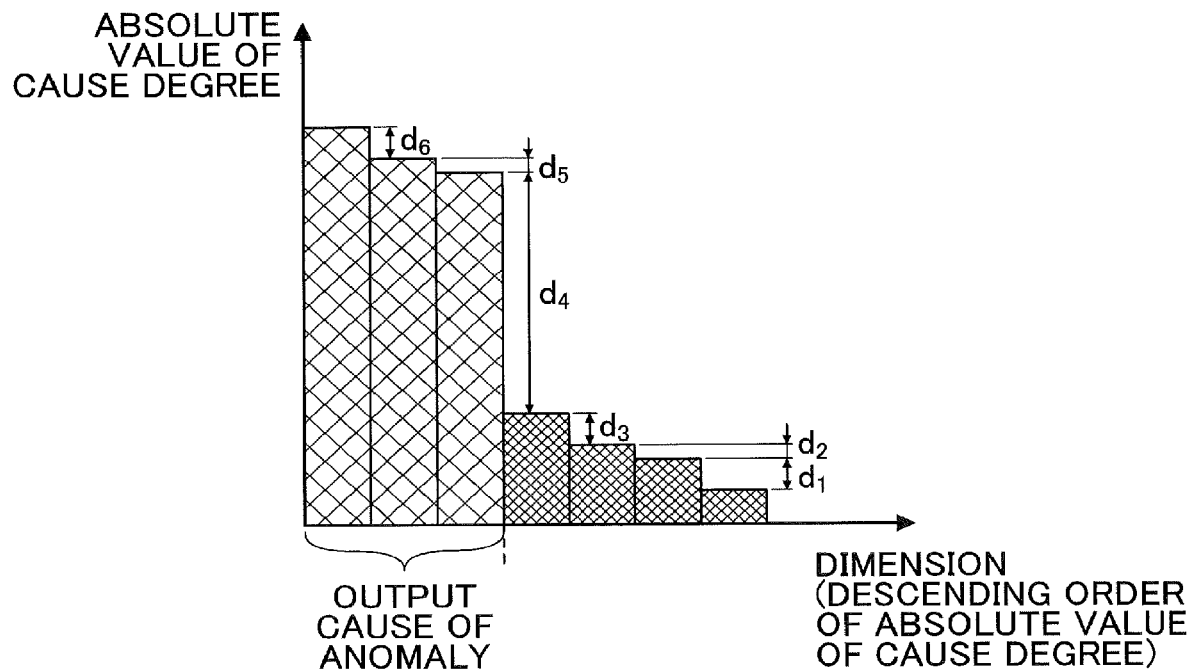
FIG. 4 is a diagram for explaining an example of an eighth embodiment.

FIG. 4 is a diagram for explaining an example of the eighth embodiment. For example, in the example illustrated in FIG. 4, dimensions (i.e., cause degrees) of x are arranged from left to right from an order in which an absolute value is great. Respective differences between neighbors are set as $d\_1, \ldots, d\_6$. A $d\_4$ portion that is largest of these differences is determined to mark a boundary between dimensions being causes of anomalies and dimensions not being causes of anomalies, and dimensions on a side of the greater absolute value are outputted as dimensions being causes of anomalies. Hereafter, a ninth embodiment is described.

In the ninth embodiment, explanation will be provided for the different points from the first embodiment. In the ninth embodiment, a point not specifically described may be similar to the first embodiment.

In the ninth embodiment, with respect to a dimension being a cause of an anomaly, focusing on the point of an absolute value indicative of a cause degree being large versus an absolute value indicative of a cause degree being small, the output unit 13 regards absolute values indicative of a cause degree as one-dimensional data. Further, the output unit 13 performs clustering on all dimensions with two clusters, and outputs, as dimensions being respective causes of anomalies, dimensions placed in a cluster in which the mean of absolute values indicative of causes of anomalies is greater. As a clustering method, the K-means capable of clustering with a specified number of clusters, or the like may be used. For the K-means, for example, "Jain, Anil K. "Data clustering: 50 years beyond K-means." Pattern recognition letters 31.8 (2010): 651-666," etc. may be referenced.

Note that, as an example, explanation has been provided above for comparison of the mean of the absolute values between clusters. However, a value to be compared between the clusters is not limited to a predetermined statistic quantity, when it is based on a statistic quantity indicating a trend of the entire cluster. In such a manner, for example, a median value may be compared between the clusters.

Hereafter, a tenth embodiment is described. In the tenth embodiment, explanation will be provided for the different points from the first embodiment. In the tenth embodiment, a point not specifically described may be similar to the first embodiment.

In the tenth embodiment, when anomaly data of which the cause is known, as well as a cause-degree vector of such data, are given, the output unit 13 outputs, as a cause in terms of test data, a cause in terms of anomaly data corresponding to the cause-degree vector that is at the closest distance to a vector x. In this description, the cause refers to a cause for anomaly itself, such as a failure of a router, and is directed to a concept for the whole anomaly data. By way of example, a cause-degree vector of anomaly data of which the cause is known is obtained by the calculation unit 12 that executes a similar process to step S102 in FIG. 3, with respect to the anomaly data.

Figure 5:
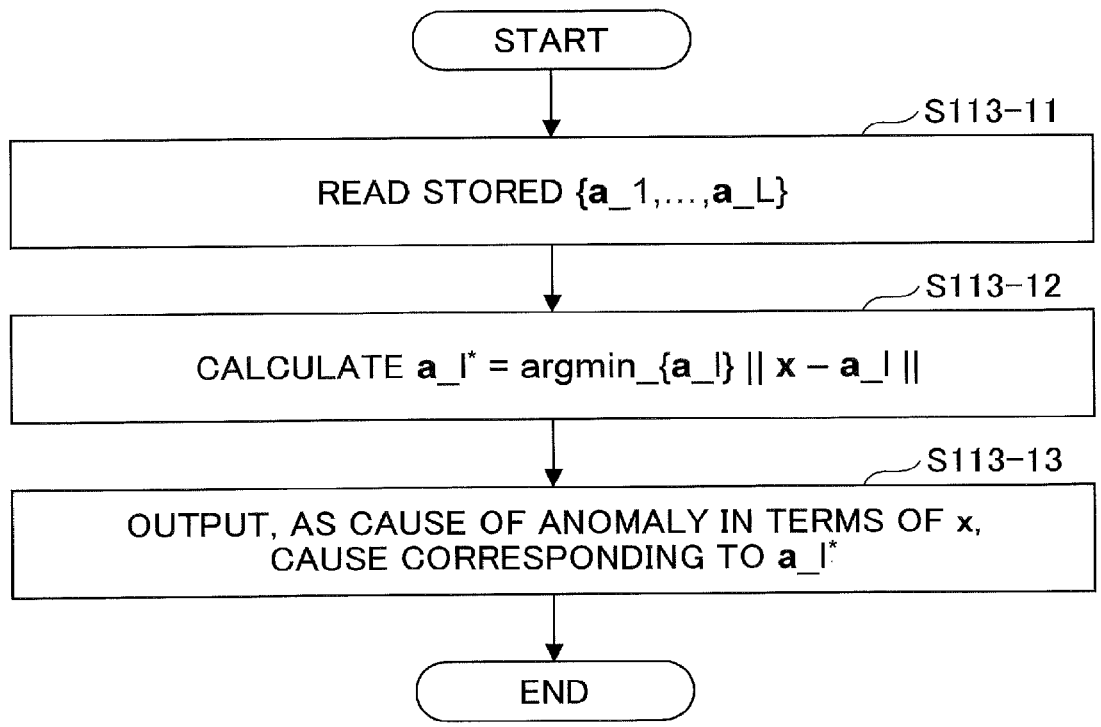
FIG. 5 is a flowchart for explaining an example of a processing procedure performed by an output unit 13 according to a tenth embodiment.

FIG. 5 is a flowchart for explaining an example of a processing procedure performed by the output unit 13 according to the tenth embodiment. In the tenth embodiment, instead of step S103 in FIG. 3, the processing procedure illustrated in FIG. 5 is performed. Further, in the tenth embodiment, it is assumed that $a\_1$ ($l=1, \ldots, L$) that is a cause-degree vector with respect to each of L pieces of anomaly data of which the cause is known, is preliminarily stored by the auxiliary storage device 102. In other words, $a\_1$ may be also referred to as a label indicating a cause of an anomaly.

In step S103-11, the output unit 13 reads a cause-degree vector $a\_1$ ($l=1, \ldots, L$) of each piece of anomaly data. Subsequently, from among cause-degree vectors $a\_1$, the output unit 13 calculates $a\_1^*$ that is at a closest distance to the vector x, i.e., $a\_1^*=\mathrm{argmin}\_\{a\_1\}\|x-a\_1\|$ (S103-12).

Subsequently, the output unit 13 outputs a cause corresponding to a_1*, as a cause in terms of x (detected cause of the anomaly) (S103-13).

Figure 6:
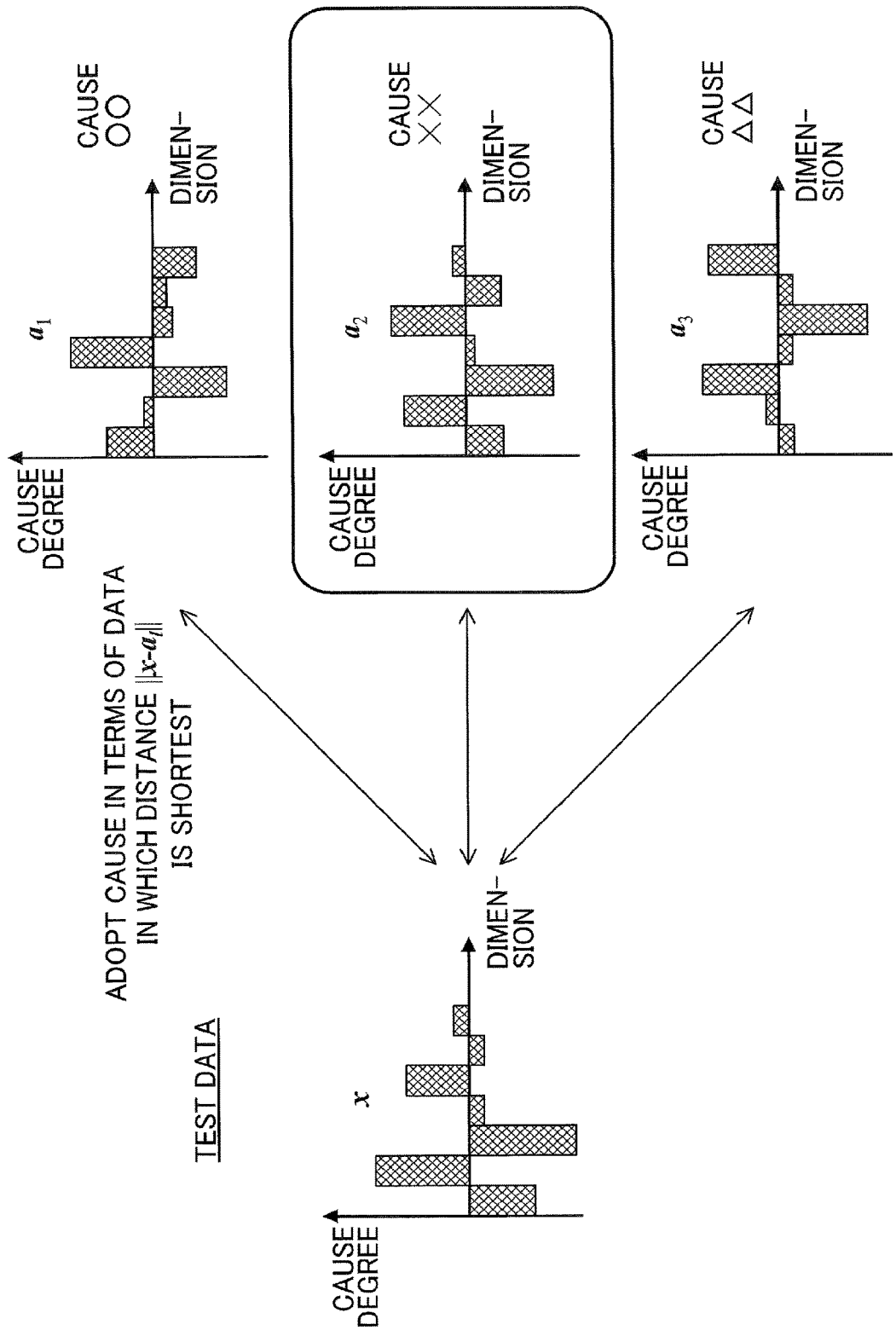
FIG. 6 is a diagram for explaining an example of a tenth embodiment.

FIG. 6 is a diagram for explaining an example of the tenth embodiment. In the example illustrated in FIG. 6, cause-degree vectors $a_1$, $a_2$, and $a_3$ of anomaly data of which the cause is known are given, where "cause xx", which is a cause corresponding to $a_2$ that is at a closest distance to a cause-degree vector x of test data, is estimated as the cause in terms of the test data.

Hereafter, an eleventh embodiment is described. In the eleventh embodiment, explanation will be provided for the different points from the first embodiment. In the eleventh embodiment, a point not specifically described may be similar to the first embodiment.

In the eleventh embodiment, when a plurality of pieces of anomaly data of which the cause is known, as well as cause-degree vectors of the respective pieces of anomaly data are given, the output unit 13 performs clustering on a vector x and the cause-degree vectors to output, as a cause of an anomaly in terms of test data, a cause in terms of the anomaly data appearing in a same cluster as the vector x.

Figure 7:
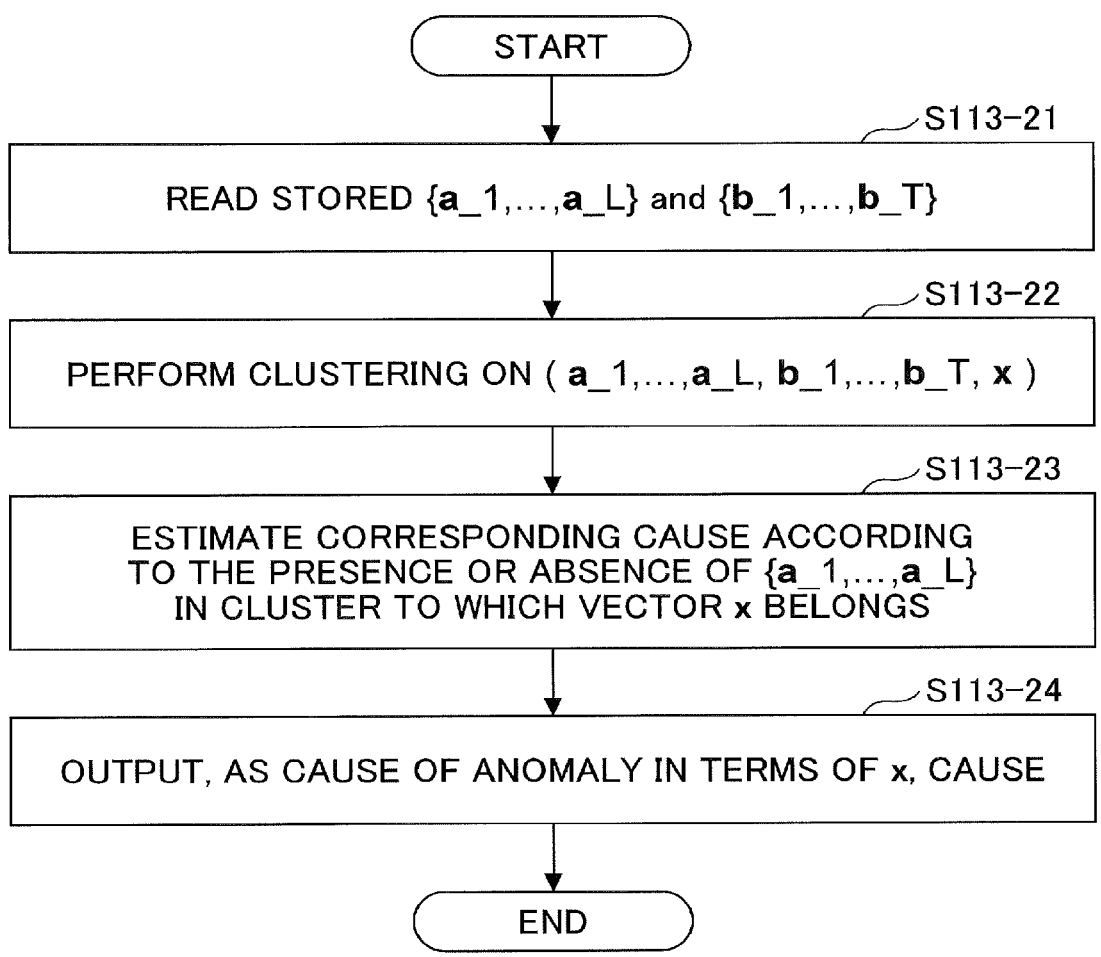
FIG. 7 is a flowchart for explaining an example of a processing procedure performed by an output unit 13 according to an eleventh embodiment.

FIG. 7 is a flowchart for explaining an example of a processing procedure performed by the output unit 13 according to the eleventh embodiment. In the eleventh embodiment, instead of step S103 in FIG. 3, the processing procedure illustrated in FIG. 7 is performed. Further, in the eleventh embodiment, it is assumed that respective cause-degree vectors a_1 (l=1, . . . , L) of L pieces of anomaly data of which the cause is known, as well as cause-degree vectors b_t (t=1, . . . , T) of each piece of test data that was previously determined as anomaly, are preliminarily stored by the auxiliary storage device 102.

In step S103-21, the output unit 13 reads, from the auxiliary storage device 102, the respective cause-degree vectors a_1 and the cause-degree vectors b_t. Subsequently, the output unit 13 performs clustering on a data set (a_1, . . . , a_L, b_1, . . . , b_T, x) that combines a cause-degree vector x of test data, which is determined as anomaly, and the read a_1 and b_t (S103-22).

Clustering methods include the K-means method described above and various methods such as DBScan and t-SNE. For DBScan, for example, "Tran, Thanh N., Klaudia Drab, and Michal Daszykowski. "Revised DBSCAN algorithm to cluster data with dense adjacent clusters." Chemometrics and Intelligent Laboratory Systems 120 (2013): 92-96, etc." may be referenced. For t-SNE, for example, "Maaten, Laurens van der, and Geoffrey Hinton. "Visualizing data using t-SNE. "Journal of Machine Learning Research 9. Nov (2008): 2579-2605," etc. may be referenced. With an autoencoder or the like, clustering may be performed on data compressed in dimensions with respect to a given cause-degree vector, without clustering on the cause-degree vector directly.

After such clustering is performed, the output unit 13 checks if a_1, . . . a_L appears in a cluster to which x belongs (S113-23). If only one a_1 appears in the cluster to which x belongs, the output unit 13 outputs a cause of a_1 above, as a cause (detected cause of the anomaly) in terms of x. If a plurality of a_1 among 1_1, . . . , and a_L appear in the cluster to which x belongs, the output unit 13 selects a most common cause from those causes. If the number of causes is same, a method of choosing randomly, etc. may be used. If a_1, . . . , and a_L do not appear in the cluster, the output unit 13 may output the cause as unknown, or may select a_1 that is at a closest distance by the method according to the tenth embodiment to output the cause of a_1.

Hereafter, a result of estimating a cause as with the first embodiment is described. In this description, learning data and test data were formed artificially, and evaluation was based on whether dimension(s) involving an anomaly in terms of test data are correctly estimated. Where, data had 100 dimensions, and each dimension of learning data was formed as follows:

x_1 to x_10: $N(1000,200^2)$ (mean 1000: a random number in accordance with a normal distribution with standard deviation of 200)

x_{i+j×10}: $(1+0.1\times i)xx\_i^2+N(100,50^2)$ for i=1:10, j=1:9 (adding a value proportional to a square of x_1 to x_10 into noise in accordance with a normal distribution with the mean of 100 and standard deviation of 50)

With respect to learning data, 10,000 records were created for 100-dimensional vectors. On the other hand, with respect to test data, as one record, a 100-dimensional vector was formed, as in the case with the learning data, after which x_91 to x_100 were each set to be one-tenth of an original value. In other words, 10 dimensions of x_91 to x_100 were dimensions that involved causes of the anomaly.

As an anomaly detecting algorithm, an autoencoder (Non-Patent Document 2) was used to perform learning using the learning data in a case where the number of dimensions of an intermediate layer was 10, an activation function was a sigmoid function and the number of learning epochs was 500. Further, anomaly detection was performed with respect to the test data. Note that, with respect to each of the learning data and the test data, a value of each dimension was standardized based on the mean and variance with respect to the learning data, followed by performing learning and anomaly detection.

Figure 8:
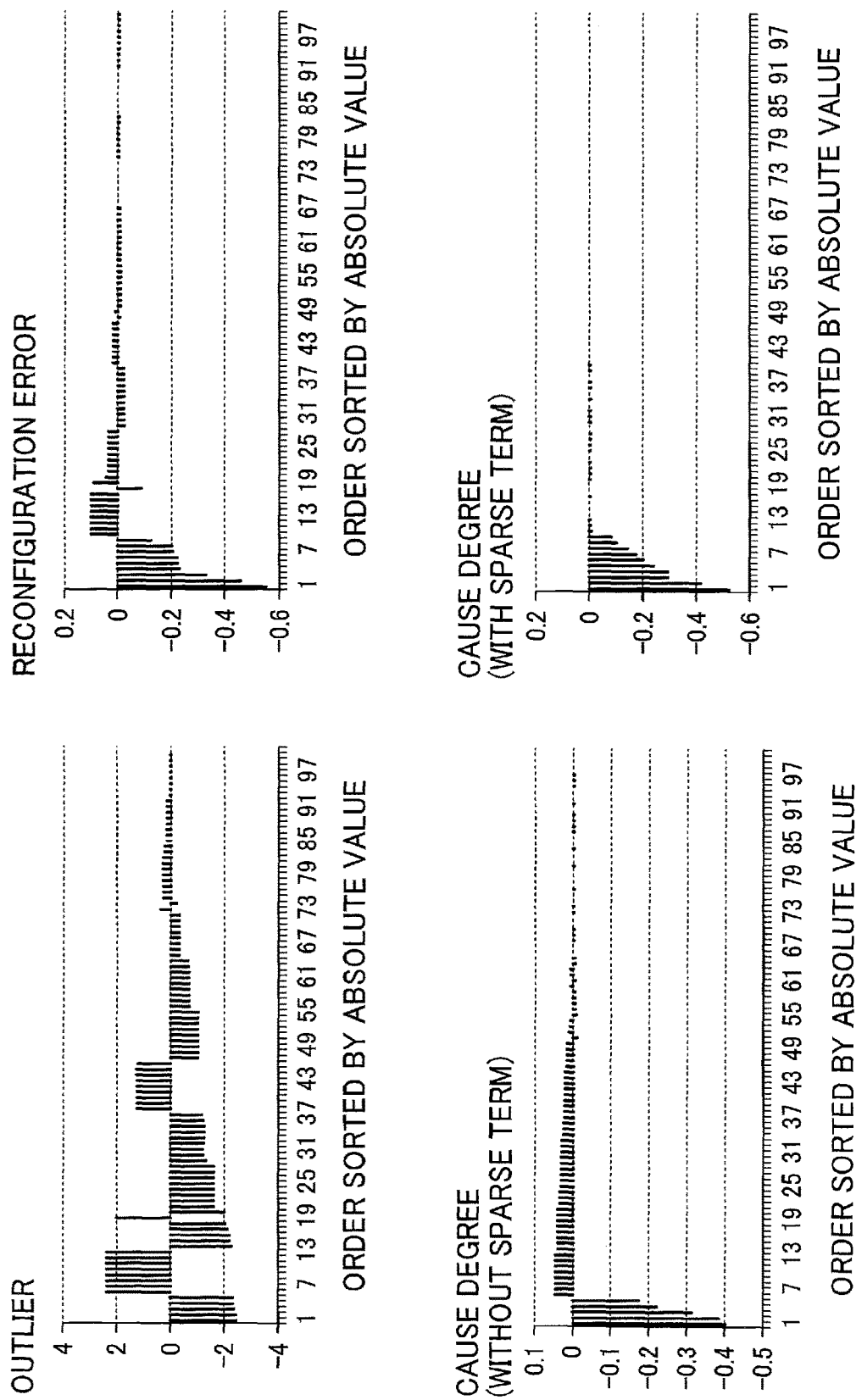
FIG. 8 is a graph in which feature quantities are sorted by absolute value in a case of estimating causes according to the first embodiment.

In estimating a cause as with the first embodiment, in a case of p=1, c_1=c_2= . . . =c_N=1 with λ=0.0005, a proximity gradient method was used to solve an optimization problem with a general sparse term. FIG. 8 illustrates a graph in which absolute values indicative of cause degrees are arranged an order from greater value, where an outputted degree of cause is referred to as a "cause degree."

In this case, by way of comparison, an outlier, a reconstruction error, and a cause degree obtained when a sparse term was not added to an optimization problem, according to the first embodiment, were also sorted by absolute value.

From FIG. 8, with respect to each of the outlier, the reconstruction error, and the cause degree (without sparse term), many dimensions had values. In contrast, with respect to the cause degree with respect to the sparse term, only 10 dimensions had values, but other dimensions had values of nearly zero. These 10 dimensions were x_91 to x_100, each of which was the cause of the anomaly in terms of the test data. In other words, it was found that only the cause degree with respect to the sparse term narrowed down dimensions (=feature quantities) that were estimated as the causes.

FIG. 9 illustrates ratios (which are hereafter referred to as "calculation accuracy") each of which is shown by x_91 to x_100 being actual causes, with respect to top 10 items of absolute values indicative of cause degrees. In this description, learning data and test data were randomly generated in 10 trials. In each trial, with respect to each evaluated value (an outlier, a reconfiguration error, a cause degree (without a sparse term), and a cause degree (with sparse term included)), top 10 absolute values were evaluated in terms of ratios each of which was shown by x_91 to x_100 being actual causes, as well as the mean of such ratios. From FIG. 9, it was found that only the cause degree with respect to the sparse term indicated that the causes were able to be estimated with 100% accuracy in each trial.

FIG. 10 illustrates a result of evaluating calculation speed in a case where an initial value used in solving an optimization problem as with the third embodiment is set. In this description, units are seconds. An outlier indicated a result in a case of using an outlier as an initial value, and recon. indicated a result in a case of using reconfiguration error. Where, a was set as α=0.5. Calculation accuracy was 1 in all cases. From FIG. 10, it could be confirmed that calculation time was able to be reduced by setting the initial value as the outlier or the reconstruction error.

Figure 11:
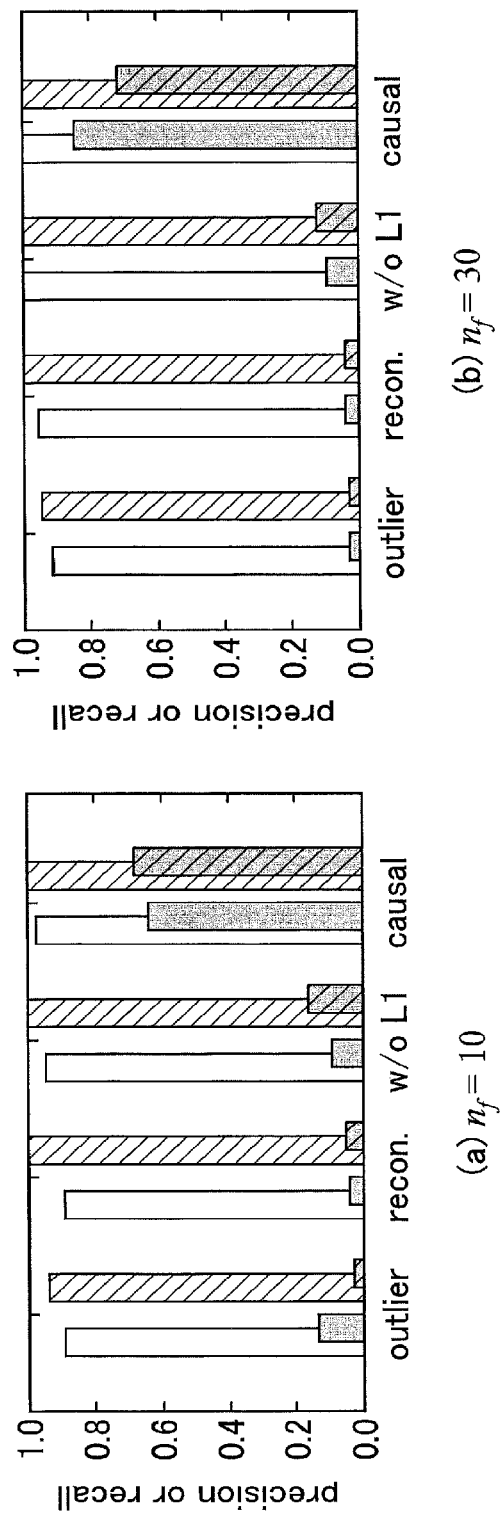
FIG. 11 is a diagram illustrating an example of precision of estimating according to the sixth embodiment.

FIG. 11 illustrates precision in a case of estimating, as dimensions of causes, dimensions in which absolute values indicative of cause degrees exceed a threshold, when setting, as the threshold, the mean of absolute values indicative of cause degrees in terms of the absolute values indicative of the cause degrees, as with the sixth embodiment. In FIG. 11, an outlier, a reconstruction error, a cause degree (without a sparse term), and a cause degree (with a sparse term) were respectively indicated by outlier, recon., w/o L1, and causal. A plain bar chart showed recall that indicated a ratio of dimensions estimated as causes of anomalies to dimensions being actual causes. A plain bar graph showed precision that indicated a ratio of dimensions being actual causes to dimensions extracted as causes. Each non-hatched bar showed β=100 and γ=50, and a hatched bar showed β=200 and γ=50.

From FIG. 11, without the limitation to α and β, with respect to the methods other than causal, it was found that recall was high but precision was very low, and further, there were many dimensions that were not actual causes among dimensions estimated as causes of anomalies. On the other hand, with respect to causal, it was found that each of recall and precision was relatively high, and further, the number of dimensions that were mistakenly estimated as causes was kept small on account of approximately estimating the dimensions being actual causes. Accordingly, it was found that the dimensions being the causes of anomalies were able to be accurately estimated according to the sixth embodiment.

Figure 12:
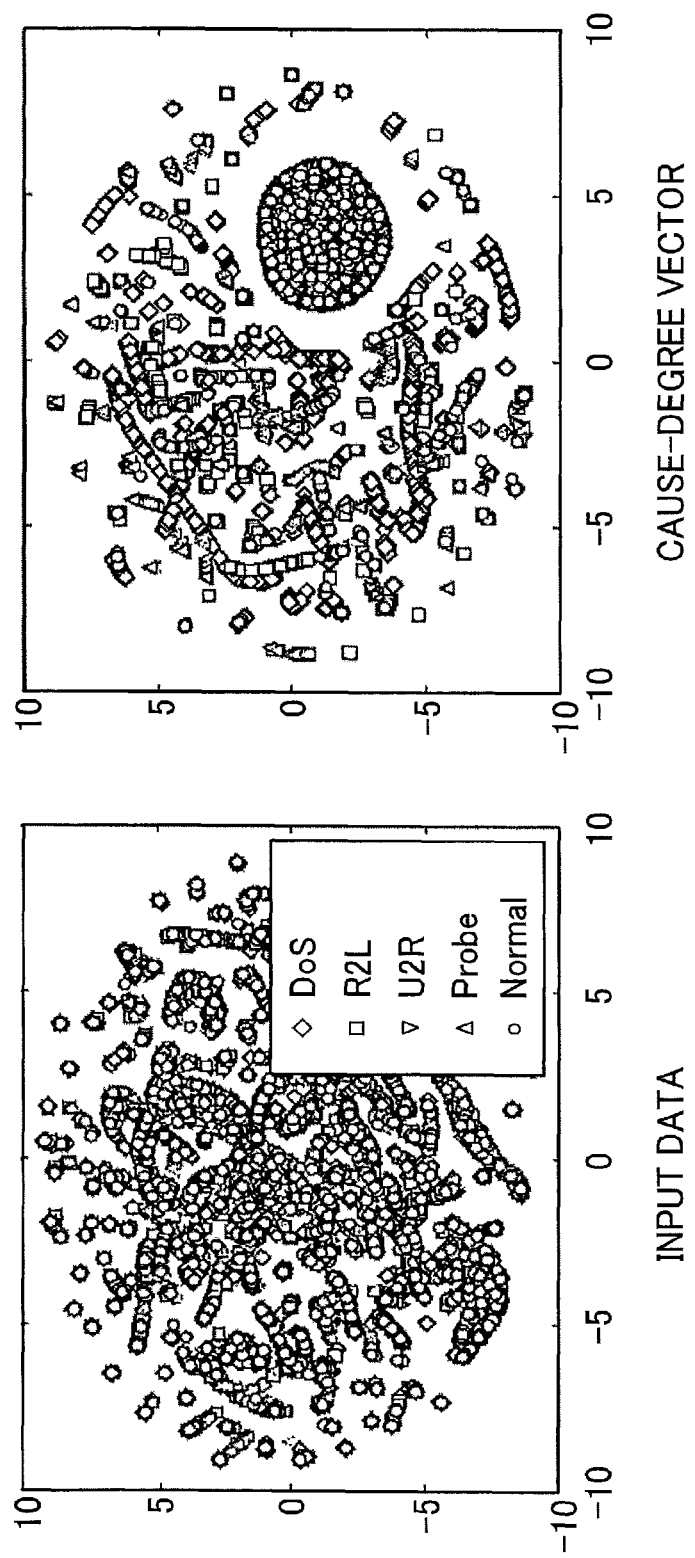
FIG. 12 is a diagram illustrating an example of a result of clustering cause degrees according to the eleventh embodiment.

FIG. 12 illustrates a result of clustering calculated cause-degree vectors where, as with the eleventh embodiment, anomaly detection by an autoencoder, as well as a cause estimating algorithm dealing with an optimization problem with a sparse term, were executed, using NSL-KDD (Tavallae, Mahbod, et al, "A detailed analysis of the KDD CUP 99 data set. "Computational Intelligence for Security and Defense Applications, 2009. CISDA 2009. IEEE Symposium on. IEEE, 2009.) which served as a typical benchmark for a network.

In FIG. 12, t-SNE was used as a clustering method. A result of clustering input data directly (left in FIG. 12), and a result of clustering by use of cause-degree vectors (right in FIG. 12) were illustrated. In this figure, results of mapping multidimensional cause degrees in a two-dimensional space were plotted by t-SNE, forming a distance relationship between the cause degrees. Accordingly, data that had a similar cause-degree vector was plotted in the two-dimensional space to form a same cluster. Also, in FIG. 12, in order to show how many clusters relating to actual causes were formed, different symbols that represented respective actual causes of anomalies (DoS, R2L, U2R, Probe, Normal) were plotted with respect to given data. Note that Normal indicated that it was not actually anomaly, and a circular cluster on a right side of FIG. 12 indicated a cluster in which cause degrees indicative of dimensions of cause-degree vectors were all zero, i.e., a cluster that was not determined as anomaly.

Because anomalies do not occur frequently, anomaly data of which the cause is known is not sufficiently obtained. This faces a problem of being unable to easily identify causes by supervised learning. However, as illustrated in FIG. 12, data relating to a same cause tends to appear in a same cluster. Accordingly, the eleventh embodiment indicates that possible causes of anomalies are identified, even when there is little anomaly data of which the cause is known.

As described above, according to the above embodiments, when an anomaly is detected by an anomaly detecting algorithm that calculates an anomaly degree of input data, vector(s) that decreases an anomaly degree are searched, and a cause of the anomaly is estimated based on a difference between the searched vector(s) and vector(s) of the input data. In this case, the term (c) relating to a "likelihood" of a given dimension being a cause can be included in an objective function of searching. Thereby, with respect to the input data that is detected as anomaly, estimations of causes can be performed with precise accuracy. Also, an initial value used in the search and a search area are provided in response to input data or output of an algorithm, thereby reducing time required for the search.

Note that in the above embodiments, the anomaly cause estimating apparatus 10 is an example of an apparatus for estimating anomaly information. The calculation unit 12 is an example of each of an estimation unit and a search unit.

The embodiments of the present invention have been described above in detail. However, the present invention is not limited to such specific embodiments, and various modifications and changes can be made within the scope of the spirit of the invention as set forth in the claims.

This application claims priority under Japanese Patent Application No. 2017-098080 filed on May 17, 2017, which is hereby incorporated by reference in its entirety.

REFERENCE SIGNS LIST 10 anomaly cause estimating apparatus
11 input unit
12 calculation unit
13 output unit
100 drive device
101 recording media
102 auxiliary storage device
103 memory device
104 CPU
105 interface device
B bus

The invention claimed is:

1. An apparatus for estimating anomaly information comprising:
processing circuitry configured to:
input anomaly data detected as an anomaly by an anomaly detecting algorithm that outputs an anomaly degree of input data for vectors, using learning of the vectors in a normal state, the anomaly degree indicating an extent to which an anomaly of the input data occurs, and the inputted anomaly data is detected as data observed in a system; and
search for one or more vectors that decrease the degree of anomaly when added to the anomaly data, taking into account a likelihood, for each dimension, of a given dimension being a cause of the anomaly, and estimate the cause of the anomaly based on the searched vectors.

2. The apparatus according to claim 1, wherein the processing circuitry is configured to estimate, as the cause of the anomaly, one or more dimensions taking a non-zero value with respect to the searched vectors.

3. The apparatus according to claim 1, wherein the processing circuitry is configured to search the vectors under a constraint condition on a possible range for dimensions of the vectors.

4. The apparatus according to claim 1, wherein the processing circuitry is configured to input a value indicative of variation from the vectors in the normal state, for each dimension of the anomaly data, and
the processing circuitry is configured to search for the vectors through a value, as an initial value, identified based on the anomaly data and the value indicative of variation.

5. The apparatus according to claim 1, wherein the processing circuitry is configured to input a value indicative of variation from the vectors in the normal state, for each dimension of the anomaly data, and
the processing circuitry is configured to search for the vectors, by fixing, to zero, at least one dimension for the value indicative of variation, the value being smaller than a threshold.

6. The apparatus according to claim 1, wherein the processing circuitry is configured to output information relating to the cause of the anomaly based on the searched vectors.

7. The apparatus according to claim 6, wherein the processing circuitry is configured to output, as the cause of the anomaly, at least one dimension of which an absolute value exceeds a threshold, from among dimensions of the searched vectors.

8. The apparatus according to claim 7, wherein the threshold is a value based on each dimension of vectors searched from previous anomaly data.

9. The apparatus according to claim 6, wherein the processing circuitry is configured to sort absolute values for each dimension of the searched vectors, and output, as the cause of the anomaly, at least one dimension based on a difference in absolute values between adjoining dimensions.

10. The apparatus according to claim 6, wherein the processing circuitry is configured to cluster absolute values for each dimension of the searched vectors, and output, as the cause of the anomaly, a dimension appearing in a cluster of a greater statistic quantity with respect to the absolute value.

11. An apparatus for estimating anomaly information comprising:
processing circuitry configured to
input anomaly data detected as an anomaly by an anomaly detecting algorithm that outputs an anomaly degree of input data for vectors, using learning of the vectors in a normal state, the anomaly degree indicating an extent to which an anomaly of the input data occurs, and the inputted anomaly data is detected as data observed over a network;
search for one or more first vectors that decrease the anomaly degree when added to the anomaly data, taking into account a likelihood, for each dimension, of a given dimension being the cause of the anomaly; and
output the cause of the anomaly by using the first vectors and one or more second vectors, the second vectors being of a plurality of vectors of which causes of anomalies are known and being searched in a same manner as the first vectors.

12. The apparatus according to claim 11, wherein
the processing circuitry is configured to output the cause of the anomaly based on a result of clustering by use of the first vectors and the one or more second vectors.

13. A method for estimating anomaly information comprising:
inputting anomaly data detected as an anomaly by an anomaly detecting algorithm that outputs an anomaly degree of input data for vectors, using learning of the vectors in a normal state, the anomaly degree indicating an extent to which an anomaly of the input data occurs, and the inputted anomaly data is detected as data observed over a network; and
searching for one or more vectors that decrease the anomaly degree when added to the anomaly data, taking into account a likelihood, for each dimension, of a given dimension being a cause of the anomaly, and estimating the cause of the anomaly based on the searched vectors.

14. A method for estimating anomaly information comprising:
inputting anomaly data detected as an anomaly by an anomaly detecting algorithm that outputs an anomaly degree of input data for vectors, using learning of the vectors in a normal state, the anomaly degree indicating an extent to which an anomaly of the input data occurs, and the inputted anomaly data is detected as data observed over a network;
searching for one or more first vectors that decrease the anomaly degree when added to the anomaly data, taking into account a likelihood, for each dimension, of a given dimension being a cause of the anomaly; and
outputting the cause of the anomaly by using the first vectors and one or more second vectors, the second vectors being of a plurality of vectors of which causes of anomalies are known and being searched in a same manner as the first vectors.

15. The method according to claim 14, wherein
the outputting includes outputting the cause of the anomaly based on a result of clustering by use of the first vectors and the one or more second vectors.

16. The apparatus according to claim 11, wherein the output unit is configured to output the cause of the anomaly based on a distance between the first vectors and the one or more second vectors.

17. The method according to claim 14, wherein the outputting includes outputting the cause of the anomaly based on a distance between the first vectors and the one or more second vectors.

18. The apparatus according to claim 1, wherein the processing circuitry is further configured to input a predetermined threshold value,
the searched one or more vectors are vectors that decrease the degree of anomaly to be less than or equal to the inputted threshold value when added to the anomaly data, and
the estimate of the cause of the anomaly is based on the searched vectors which resulted in the decrease the degree of anomaly to be less than or equal to the inputted threshold value.

19. The apparatus for estimating anomaly information according to claim 1, wherein the system includes a network, and
the observed data is one of MIB (Management Information Base) data, flow data, and CPU utilization data.

20. The apparatus according to claim 19, wherein the cause of the anomaly is one of a denial of service attack (DoS), a remote to local (R2L) attack, a root (U2R) attack, a probe attack, and normal traffic.

* * * * *